United States Patent [19]
Schwindeman et al.

[11] Patent Number: 6,121,474
[45] Date of Patent: Sep. 19, 2000

[54] AMINE ANIONIC POLYMERIZATION INITIATORS AND FUNCTIONALIZED POLYMERS DERIVED THEREFROM

[75] Inventors: James Anthony Schwindeman, Lincolnton; Eric John Granger, Charlotte, both of N.C.; Roderic Paul Quirk, Akron, Ohio; Randy W. Hall, Kings Mountain; Robert James Letchford, Cherryville, both of N.C.

[73] Assignee: FMC Corporation, Philadelphia, Pa.

[21] Appl. No.: 09/256,737

[22] Filed: Feb. 24, 1999

[51] Int. Cl.$^7$ .................................. C07F 7/02; C07F 7/10
[52] U.S. Cl. ............................... 556/410; 556/412
[58] Field of Search ...................... 556/410, 412

[56] References Cited

U.S. PATENT DOCUMENTS

| | | | |
|---|---|---|---|
| 3,326,881 | 6/1967 | Uraneck et al. | 260/94.6 |
| 3,776,964 | 12/1973 | Morrison et al. | 260/665 R |
| 3,842,146 | 10/1974 | Milkovich et al. | 260/879 |
| 3,862,100 | 1/1975 | Halasa et al. | 260/94.2 |
| 3,954,894 | 5/1976 | Kamienski et al. | 260/665 R |
| 4,039,593 | 8/1977 | Kamienski et al. | 260/635 F |
| 5,238,893 | 8/1993 | Hergenrother et al. | 502/155 |
| 5,274,106 | 12/1993 | Lawson et al. | 548/300.1 |
| 5,331,058 | 7/1994 | Shepherd et al. | 525/332.3 |
| 5,391,663 | 2/1995 | Bening et al. | 526/178 |
| 5,416,168 | 5/1995 | Willis et al. | 525/333.2 |
| 5,496,940 | 3/1996 | Lawson et al. | 540/450 |
| 5,523,364 | 6/1996 | Engel et al. | 526/180 |
| 5,527,753 | 6/1996 | Engel et al. | 502/155 |
| 5,550,203 | 8/1996 | Engel et al. | 526/336 |
| 5,565,526 | 10/1996 | Schwindeman et al. | 525/272 |
| 5,567,774 | 10/1996 | Schwindeman et al. | 525/272 |
| 5,605,872 | 2/1997 | Engel et al. | 502/157 |

FOREIGN PATENT DOCUMENTS

| | | |
|---|---|---|
| 2 255 567 | 11/1992 | United Kingdom . |
| WO 97/05176 | 2/1997 | WIPO . |
| WO 97/05180 | 2/1997 | WIPO . |
| WO 98/02465 | 1/1998 | WIPO . |

*Primary Examiner*—Floyd D. Higel
*Attorney, Agent, or Firm*—Alston & Bird LLP

[57] ABSTRACT

Protected amine anionic polymerization initiators useful in the preparation of polymers having a protected amine functional group. The initiators are very soluble in hydrocarbon solvents.

19 Claims, No Drawings

AMINE ANIONIC POLYMERIZATION INITIATORS AND FUNCTIONALIZED POLYMERS DERIVED THEREFROM

FIELD OF THE INVENTION

The present invention relates to novel anionic polymerization initiators, and more particularly to anionic polymerization initiators having amine functionality, as well as processes for making and using the same and polymers prepared using the initiators.

BACKGROUND OF THE INVENTION

Anionic initiators which contain tertiary amine funtionality have been employed in hydrocarbon solvent polymerizations. Such initiators have the general formula

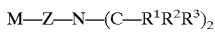

wherein M is defined as an alkali metal selected from lithium, sodium and potassium; Z is defined as a branched or straight chain hydrocarbon connecting group which contains 3–25 carbon atoms; and $R^1$, $R^2$ and $R^3$ are independently defined as hydrogen, alkyl, substituted alkyl groups, aryl or substituted aryl groups. See M. J. Stewart, N. Shepherd, and D. M. Service, *Brit. Polym. Jl.*, 22, 319–325 (1990). However, these amine functional initiators possess low solubility in hydrocarbon solvents (typically less than 0.3 Molar in aliphatic or cycloaliphatic solvents like hexane or cyclohexane). The addition of an ethereal co-solvent does increase the solubility of these initiators; however, this also increases the amount of 1,2-microstructure in the resultatant polymer. See H. L. Hsieh and R. P. Quirk, *Anionic Polymerization Principles and Practical Applications*, pp. 397–400. Various other techniques have been employed to increase the solubility of these initiators in hydrocarbon solvent. For example, chain extension of the initiator with a conjugated diene increased the solubility several fold. See U.S. Pat. No. 5,527,753.

The facile preparation of alpha, omega-difunctional ("telechelic") polymers has long been sought. These polymers have utility in coatings, adhesives, sealants, asphalt modification, and rocket fuel binders. While progress has been achieved in the synthesis of dihydroxy terminated polymers, the synthesis of diamino terminated polymers remained relatively unexplored.

Nakahama reported the preparation of amino terminated polystyrene by trapping the dianion with an electrophile that contained a protected amine group. A high degree of functionality was achieved by this technique. See K. Ueda, A. Hirao, and S. Nakahama, *Macromolecules*, 23, 939–945 (1990). However, the reaction conditions (−78° C., THF solvent) were not practical for commercial production of these functionalized polymers.

El-Aasser et al. recently reported the preparation of amino terminated telechelic polybutadiene by a free radical approach. See J. Xu, V. L. Dimonie, E. D. Sudol, and M. S. El-Aasser, *Journal of Polymer Science: Part A: Polymer Chemistry*, 33, 1353–1359 (1995). Since this is a free radical synthesis, little control of molecular weight, molecular weight distribution, and position of the amine functional group was obtained. Clearly, a reliable, industially applicable synthesis of a telechelic diamine polymer that allows precise control of the molecular architecture is still required.

SUMMARY OF THE INVENTION

The present invention provides anionic polymerization initiators having a protected omega-tertiary amine functionality. In contrast to many prior initiators having an amine functionality, the initiators of the invention exhibit improved hydrocarbon solubility. As a result, the initiators of the invention are more easily prepared. In addition, the increased hydrocarbon solubility provides cost savings in shipping hydrocarbon compositions of the initiators.

Further, the initiators can provide advantages in use. For example, polymers produced using the amine initiators of the invention have a high degree of amine functionality. Further, the initiators can be used under commercially viable conditions, i.e., ether solvents and/or extremely low polymerization temperatures are not required. Still further because the initiators are useful in anionic polymerization, the initiators can provide precise control of the polymer molecular architecture, including control of molecular weight, molecular weight distribution, and position of the amine functional group.

The initiators of the invention have the following general structures:

or

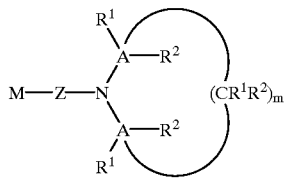

wherein:

M is an alkali metal selected from lithium, sodium and potassium;

Z is a branched or straight chain hydrocarbon connecting group which contains 3–25 carbon atoms, optionally substituted with aryl or substituted aryl;

A is an element selected from Group IVa of the Periodic Table of the Elements, with the proviso that at least one A is silicon;

$R^1$, $R^2$, and $R^3$ are each independently selected from the group consisting of hydrogen, alkyl, substituted alkyl, aryl, substituted aryl, cycloalkyl, and substituted cycloalkyl; and m is an integer from 1 to 7

The present invention also provides processes for making the initiators of the invention as well as processes for using the initiators to prepare mono-, di-, or multi-amino functional linear and radial polymers derived from these initiators. The mono-, di-, or multi- amino functionalized linear and radial polymers derived from these initiators may be optionally hydrogenated to provide their hydrogenated analogues. Further, the polymers may be optionally deprotected and the liberated functionality reacted with a difunctional comonomer to afford segmented block copolymers.

DETAILED DESCRIPTION OF THE INVENTION

The present invention provides novel hydrocarbon soluble anionic initiators, and mixtures of such initiators, containing an omega-tertiary-amino group and having the following general structures:

or

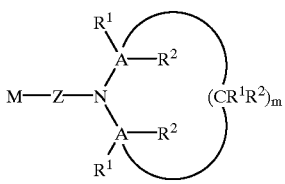
(II)

wherein:

M is an alkali metal selected from lithium, sodium and potassium;

Z is a branched or straight chain hydrocarbon connecting group which contains 3–25 carbon atoms, optionally substituted with aryl or substituted aryl;

A is an element selected from Group IVa of the Periodic Table of the Elements with the proviso that at least one A is silicon;

$R^1$, $R^2$, and $R^3$ are each independently selected from the group consisting of hydrogen, alkyl, substituted alkyl, aryl, substituted aryl, cycloalkyl, and substituted cycloalkyl; and m is an integer from 1 to 7.

As used herein, the term "alkyl" refers to straight chain and branched C1–C25 alkyl. The term "substituted alkyl" refers to C1–C25 alkyl substituted with one or more lower C1–C10 alkyl, lower alkoxy, lower alkylthio, or lower dialkylamino. The term "cycloalkyl" refers to C3–C12 cycloalkyl. The term "substituted cycloalkyl" refers to C3–C12 cycloalkyl substituted with one or more lower C1–C10 alkyl, lower alkoxy, lower alkylthio, or lower dialkylamino. The term "aryl" refers to C5–C25 aryl having one or more aromatic rings, each of 5 or 6 carbon atoms. Multiple aryl rings may be fused, as in naphthyl or unfused, as in biphenyl. The term "substituted aryl" refers to C5–C25 aryl substituted with one or more lower C1–C10 alkyl, lower alkoxy, lower alkylthio, or lower dialkylamino. Exemplary aryl and substituted aryl groups include, for example, phenyl, benzyl, and the like.

Examples of hydrocarbon soluble initiators of this invention include, but are not limited to:

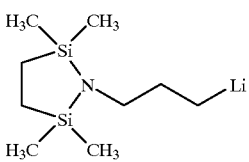

3-(2,2,5,5-tetramethyl-2,5-disila-1-azacyclopentane)-1-propyllithium

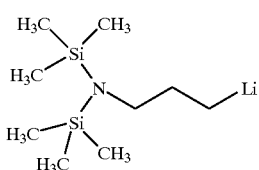

3-[N,N-bis-(trimethylsilyl)amino]-1-propyllithium

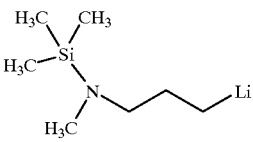

3-[N-methyl-N-(trimethylsilyl)amino]-1-propyllithium, and the like and mixtures thereof.

Unexpectedly, it was discovered that initiators of general structure I and II which include at least one silicon atom (A) in the protecting group are exceedingly soluble in hydrocarbon solution. This is surprising in view of the prior art teaching that the carbon analogs are essentially insoluble in hydrocarbons. Nowhere does the art teach or suggest that merely substituting silicon for at least one of the carbon atoms in the protecting group would increase solubility.

Preferably the initiators of the invention exhibit at least a two fold, or higher, increase in solubility as compared to their carbon analogs. For example, 3-(N,N-dimethylamino)-1-propyllithium has a maximum solubility in hydrocarbon solution of 3 wt. percent (<0.23 Molar). In spite of the higher molecular weight, 3-(2,2,5,5-tetramethyl-2,5-disila-1-azacyclopentane)-1-propyllithium, has a solubility in hydrocarbon solution greater than 20 wt. percent (>0.67 Molar). The surprising increased solubility allows the initiators of the present invention to be manufactured economically on a commercial scale.

The initiators of the invention are derived from omega-tertiary-amino-1-haloalkanes and mixtures thereof of the following general structures:

$$X-Z-N(A(R^1R^2R^3))_2 \quad (III)$$

or (IV)

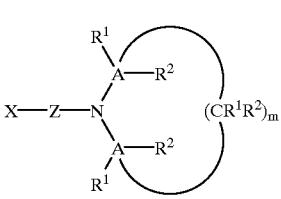

wherein:

X is halogen, preferably chlorine or bromine;

Z is a branched or straight chain hydrocarbon connecting group which contains 3–25 carbon atoms, optionally substituted with aryl or substituted aryl;

A is an element selected from Group IVa of the Periodic Table of the Elements with the proviso that at least one A is silicon;

$R^1$, $R^2$, and $R^3$ are each independently selected from the group consisting of hydrogen, alkyl, substituted alkyl, aryl, substituted aryl, cycloalkyl, and substituted cycloalkyl; and m is an integer from 1 to 7.

In the process, selected omega-tertiary-amino-1-haloalkanes, which alkyl groups contain 3 to 25 carbon atoms, are reacted with an alkali metal at a temperature between about 35° C. and about 130° C., preferably at the reflux temperature of an alkane, cycloalkane, or aromatic reaction solvent containing 5 to 12 carbon atoms and mixtures of such solvents.

Tertiary amino-1-haloalkanes raw materials (precursors) useful in the practice of this invention include, but are not limited to, 3-(2,2,5,5-tetramethyl-2,5-disila-1-azacyclopentane)-1-propyl halide, 2-methyl-3-(2,2,5,5-tetramethyl-2,5-disila-1-azacyclopentane)-1-propyl halide, 2,2-dimethyl-3-(2,2,5,5-tetramethyl-2,5-disila-1-azacyclopentane)-1-propyl halide, 4-(2,2,5,5-tetramethyl-2,5-disila-1-azacyclopentane)-1-butyl halide, 6-(2,2,5,5-tetramethyl-2,5-disila-1-azacyclopentane)-1-hexyl halide, 3-[N,N-(bis (trimethylsilyl)]-1-propyl halide, 3-[N,N-bis (trimethylsilyl)]-2-methyl-1-propyl halide, 3-[N,N-bis (trimethylsilyl)]-2,2-dimethyl-1-propyl halide, 4-[N,N-bis (trimethylsilyl)]-1-butyl halide, 5-[N,N-bis(trimethylsilyl)]-1-pentyl halide, 8-[N,N-bis (trimethylsilyl)]-1-octyl halide, 3-[N-(1,1-dimethylethyl)-N-(trimethylsilyl)]-1-propyl halide, 3-[N-(1,1-dimethylethyl)-N-(trimethylsilyl)]-2-methyl-1-propyl halide, 3-[N-(1,1-dimethylethyl)-N-(trimethylsilyl) ]-2,2-dimethyl-1-propyl halide, 3-[N-(1,1-dimethylethyl)-N-(t-butyldimethylsilyl)]-1-propyl halide, 3-[N-(1,1-dimethylethyl)-N-(t-butyldimethylsilyl)]-2-methyl-1-propyl halide, 8-[N-(1,1-dimethylethyl)-N-(t-butyldimethylsilyl) ]-1-octyl halide, 3-[N-(methyl)-N-(t-butyldimethylsilyl)]-1-propyl halide, 3-[N-(methyl)-N-(t-butyldimethylsilyl)]-2-methyl-1-propyl halide, 4-[N-(methyl)-N-(t-butyldimethylsilyl) ]-1-butyl halide, 8-[N-(methyl)-N-(t-butyldimethylsilyl)]-1-octyl halide, and 3-[N-(methyl)-N-(t-butyldiphenylsilyl)]-1-propyl halide,. The halo- or halide group is selected from chlorine and bromine.

The precursor tertiary amino-1-haloalkanes were prepared by the standard literature procedures. For instance, 2,2,5,5-tetramethyl-1-(3-chloropropyl)-1-aza-2,5-disilacyclopentane was prepared by the reaction of 3-chloropropylamine hydrochloride with 1,1,4,4-tetramethyl-1,4-dichlorodisilylethylene, as described by S. Djuric, J. Venit, and P. Magnus, *Tetrahedron Letters*, 22, 1787 (1981). A halocarbon or an ethereal solvent was successfully employed. The procedure of Schwindeman, U.S. Pat. No. 5,493,044 (Feb. 20, 1996), was employed to synthesize the t-butyldimethylsilyl protected compounds from the corresponding amine and t-butyldimethylsilyl chloride in a hydrocarbon solvent. The bis trimethylsilyl compounds were prepared as described by K. Suzuki, K. Yamaguchi, A. Hirao, and S. Nakahama, *Macromolecules*, 22, 2607 (1989). In this procedure, the corresponding mono trimethylsilyl compound was initially formed by the reaction of the corresponding amine and hexamethyldisilazane. The mono silylated material was then converted to the bis trimethylsilyl compound by metallation of the precursor with ethylmagnesium bromide, followed by addition of trimethylsilyl chloride. The precursor tertiary amino-1-haloalkanes were also prepared by the reaction of the corresponding amine with a metallating agent, R—M (such as n-butyllithium or sodium hydride), (V)

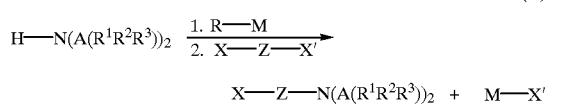

or

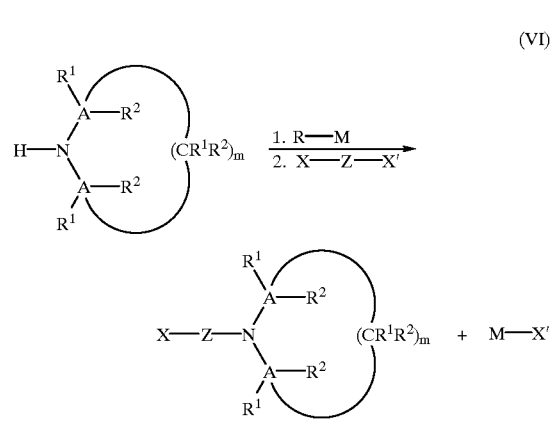

followed by the addition of an alpha, omega dihalide, such as 1-bromo-3-chloro-propane or 1,6-dichloro-hexane, as illustrated in equations V and VI. This synthetic method was originally described by J. Almena, F. Foubelo, and M. Yus, *Tetrahedron*, 51, 11883– 11890 (1995). A variation of the chemistry detailed in equation V and VI was recently disclosed in co-pending application Ser. No. 08/882,513 (Docket 6055, filed Jun. 25, 1997), the entire disclosure of which is hereby incorporated by reference. See equations VII and VIII.

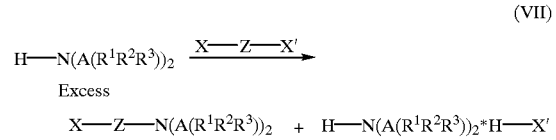

or

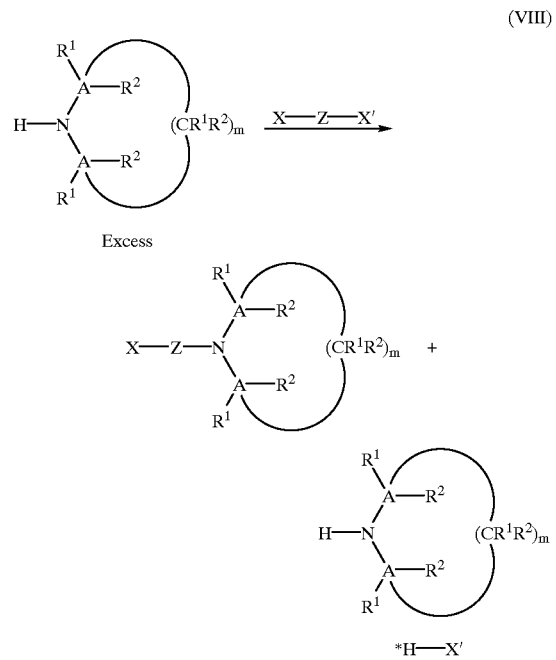

In this procedure, an excess of the amine starting material was reacted with an alpha, omega dihalide, such as 1-bromo- 3-chloro-propane or 1,6-dichloro-hexane. The excess amine served as an acid scavenger for the acid liberated in the reaction. Each of these procedures afforded the desired precursor molecules in high yield, and in high purity. The precursors could be purified, if desired, by conventional techniques, such as chromatography, distillation, or recrystallization. Typically, the precursors could be employed directly in the subsequent metallation reaction.

The alkali metal used in preparing the organometallic compounds containing tertiary amines, selected from lithium, sodium and potassium, is used as a dispersion whose particle size usually does not exceed about 300 microns. Preferably the particle size is between 10 and 300 microns although coarser particle size alkali metal can be used. When lithium metal is employed, the lithium metal can contain 0.2 to 1.0 and preferably 0.8 weight percent sodium. The alkali metal is used in amounts of 90% of theoretical to a 400% excess above the theoretical amount necessary to produce the compounds. The reaction temperature is greater than about 35° C. up to just below the decomposition of the reactants and/or the product. An abrasive can be optionally added to improve the metallation reaction. The yields of tertiary amino organometallic compounds prepared by this invention typically exceed 85%.

The present invention also provides a process for the anionic polymerization of anionically polymerizable monomers. The process of the invention includes the step of initiating polymerization of a conjugated diene hydrocarbon monomer, a mixture of conjugated diene monomers, an alkenyl substituted aromatic compound, a mixture of alkenyl substituted aromatic compounds, or a mixture of one or more conjugated diene hydrocarbons and one or more alkenyl substituted aromatic compounds in a hydrocarbon or mixed hydrocarbon-polar solvent medium at a temperature of 10° C. to 150° C. with one or more initiators having the formula:

$$M\text{---}Z\text{---}N(A(R^1R^2R^3))_2 \quad (I)$$

or

(II)

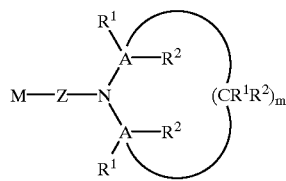

wherein M, Z, A, $R^1$, $R^2$, $R^3$ and m are as defined above, to produce an intermediate living polymer anion.

The intermediate living polymer is then reacted with a suitable protonating, functionalizing, or coupling or linking agent, as known in the art. In one aspect of the invention, the living polymer is reacted with a functionalizing agent (or electrophile) of the formula (IX)

$$X\text{---}Y\text{---}T\text{---}(A'\text{---}R^4R^5R^6)_n \quad (IX)$$

wherein:
X is halide selected from the group consisting of chloride, bromide and iodide;
Y is a branched or straight chain hydrocarbon connecting group which contains 1–25 carbon atoms, optionally substituted with aryl or substituted aryl;
T is selected from the group consisting of oxygen, sulfur, and nitrogen and mixtures thereof;

A' is an element selected from Group IVa of the Periodic Table of the Elements;
$R^4$, $R^5$, and $R^6$ are each independently selected from the group consisting of hydrogen, alkyl, substituted alkyl, aryl, substituted aryl, cycloalkyl, and substituted cycloalkyl, or $R^6$ is optionally a —$(CR^7R^8)_1$— group linking two A' when n is 2, wherein $R^7$ and $R^8$ are each independently selected from the group consisting of hydrogen, alkyl, substituted alkyl, aryl, substituted aryl, cycloalkyl, and substituted cycloalkyl, and 1 is an integer from 1 to 7; and
n is 1 when T is oxygen or sulfur, and 2 when T is nitrogen. Thus the skilled artisan will appreciate that $R^6$ as used herein includes the group

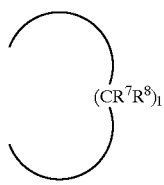

linking two A' groups when n is 2.

The functionalizing agents can be prepared as described, for example, in International Publication WO 97/16465, the entire disclosure of which is incorporated by reference. In addition, the electrophiles can be prepared as described in K. Ueda, A. Hirao, and S. Nakahama, Macromolecules, 23, 939 (1990); U.S. Pat. No. 5,496,940; U.S. Pat. No. 5,600,021; U.S. Pat. No. 5,362,699; A. Alexakis, M. Gardette, and S. Colin, Tetrahedron Letters, 29, 1988, 2951; B. Figadere, X. Franck, and A. Cave, Tetrahedron Letters, 34, 1993, 5893; J. Almena, F. Foubelo, and M. Yus, Tetrahedron, 51, 1995, 11883; D. F. Taber and Y. Wang, J. Org. Chem., 58, 1993, 6470; F. D. Toste and I. W. J. Still, Synlett, 1995, 159; and U.S. Pat. No. 5,493,044. The functionalization step can be conducted at temperatures ranging from about −30° C. to about 150° C.

Other compounds useful in functionalizing living polymers include, but are not limited to, alkylene oxides, such as ethylene oxide, propylene oxide, styrene oxide, and oxetane; oxygen; sulfur; carbon dioxide; halogens such as chlorine, bromine and iodine; propargyl halides; alkenylhalosilanes and omega-alkenylarylhalosilanes, such as styrenyldimethyl chlorosilane; sulfonated compounds, such as 1,3-propane sultone; amides, including cyclic amides, such as caprolactam, N-benzylidene trimethylsilylamide, and dimethyl formamide; silicon acetals; 1,5-diazabicyclo [3.1.0] hexane; allyl halides, such as allyl bromide and allyl chloride; methacryloyl chloride; amines, including primary, secondary, tertiary and cyclic amines, such as 3-(dimethylamino)-propyl chloride and N-(benzylidene) trimethylsilylamine; haloalkyltrialkoxysilanes; epihalohydrins, such as epichlorohydrin, epibromohydrin, and epiiodohydrin, and other materials as known in the art to be useful for terminating or end capping polymers. These and other useful functionalizing agents are described, for example, in U.S. Pat. Nos. 3,786,116 and 4,409,357, the entire disclosure of each of which is incorporated herein by reference.

Examples of difunctional coupling agents useful to form protected telechelic polymers include, but are not limited to, $Me_2SiCl_2$, $Me_2Si(OMe)_2$, $Me_2SnCl_2$, $Ph_2SiCl_2$, $MePhSiCl_2$, $ClMe_2SiCH_2CH_2SiMe_2Cl$, and $Me_2SiBr_2$, and the like and mixtures thereof.

Examples of useful multifunctional linking or coupling agents include isomeric (mixtures of ortho, meta and para)

dialkenylaryls and isomeric di- and trivinylaryls, such as 1,2-divinylbenzene, 1,'-)-divinylbenzene, 1,4-divinylbenzene, 1,2,4-trivinylbenzenes, 1,3-divinylnaphthalenes, 1,8-divinylnaphthalene, 1,2-diisopropenylbenzene, 1,3-diisopropenylbenzene, 1,4-diisopropenylbenzene, 1,-'1,5-trivinylnaphthalene, and other suitable materials known in the art to be useful for coupling polymers, as well as mixtures of coupling agents. See also U.S. Pat. Nos. 3,639,517 and 5,489,649, and R. P. Zelinski et al in J.Polym.Sci., A3, 93, (1965) for these and additional coupling agents. Mixtures of coupling agents can also be used. Generally, the amount of coupling agent used is such that the molar ratio of protected living polymer anions to coupling agents ranges from 1:1 to 24:1. This linking process is described, for example, in U.S. Pat. No. 4,409,357 and by L. J. Fetters in Macromolecules, 9,732 (1976).

The resultant polymer thus can be a linear, homotelechelic, heterotelechelic, branched, or radial polymer having one or more terminal tertiary amino functional groups. The polymer can be recovered from the reaction media and optionally hydrogenated and/or deprotected.

If a mixture of monomers is employed in the polymerization, the monomers can be added together to afford random or tapered block copolymers. The monomers can also be charged to the reactor sequentially to afford block copolymers.

Monomer(s) to be anionically polymerized to form living polymer anions can be selected from any suitable monomer capable of anionic polymerization, including conjugated alkadienes, alkenylsubstituted aromatic hydrocarbons, and mixtures thereof. Examples of suitable conjugated alkadienes include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl- 1,3-butadiene, and 2-methyl-3-isopropyl- 1,3-butadiene.

Examples of polymerizable alkenylsubstituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene and mixtures of these, as well as alkyl, cycloalkyl, aryl, alkylaryl and arylalkyl derivatives thereof in which the total number of carbon atoms in the combined hydrocarbon constituents is generally not greater than 18. Examples of these latter compounds include 3 -methylstyrene, 3,5-diethylstyrene, 4-tert-butylstyrene, 2-ethyl-4-benzylstyrene, 4-phenylstyrene, 4-p-tolylstyrene, 2,4-divinyltoluene and 4,5-dimethyl-1-vinylnaphthalene. U.S. Pat. No. 3,377,404, incorporated herein by reference in its entirety, discloses suitable additional alkenylsubstituted aromatic compounds.

The inert solvent is preferably a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include but are not limited to inert liquid alkanes, cycloalkanes and aromatic solvents and mixtures thereof. Exemplary alkanes and cycloalkanes include those containing five to 10 carbon atoms, such as pentane, hexane, cyclohexane, methylcyclohexane, heptane, methylcycloheptane, octane, decane and the like and mixtures thereof. Exemplary aryl solvents include those containing six to ten carbon atoms, such as toluene, ethylbenzene, p-xylene, m-xylene, o-xylene, n-propylbenzene, isopropylbenzene, n-butylbenzene, and the like and mixtures thereof.

Polar solvents (modifiers) can be added to the polymerization reaction to alter the microstructure of the resulting polymer, i.e., increase the proportion of 1,2 (vinyl) microstructure or to promote functionalization or randomization. Examples of polar modifiers include, but are not limited to: diethyl ether, dibutyl ether, tetrahydrofuran (THF), 2-methyltetrahydrofuran, methyl tert-butyl ether (MTBE), diazabicyclo[2.2.2]octane (DABCO), triethylamine, tri-n-butylamine, N,N,N',N'-tetramethylethylenediamine (TMEDA), and 1,2-dimethoxyethane (glyme). The amount of the polar modifier added depends on the vinyl content desired, the nature of the monomer, the temperature of the polymerization, and the identity of the polar modifier. The polar solvent (modifier) can be added to the reaction medium at the beginning of the polymerization as part of the solvent reaction medium, added during the polymerization or after polymerization but prior to functionalization or coupling.

The polymers produced may be optionally hydrogenated to afford additional novel, functionalized polymers. Examples of methods to hydrogenate the polymers of this invention are described in Falk, *Journal of Polymer Science: Part A-1*, vol. 9, 2617– 2623 (1971), Falk, *Die Angewandte Chemie,* 21, 17–23 (1972), U.S. Pat. Nos. 4,970,254, 5,166,277, 5,393,843, 5,496,898, and 5,717,035. The hydrogenation of the functionalized polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is conducted until at least 90% of the aliphatic unsaturation has been saturated. The hydrogenated functional polymer is then recovered by conventional procedures, such as removal of the catalyst with aqueous acid wash, followed by solvent removal or precipitation of the polymer.

The protecting group can be removed from the functionalized polymer, if desired. This deprotection can be conducted either prior to or subsequent to the optional hydrogentation of the aliphatic unsaturation. Deprotection of these polymers affords a linear or radial polymer which contain either a mono-, di- or multi- functional terminal primary or secondary amino group. Various methods can be employed for the removal of the protecting group. For instance, the 2,2,5,5-tetramethyl-1-aza-2,5-disila-cyclopentane (STABASE) group can be removed by treatment with acid or base, see T. W. Greene and P. G. M. Wuts, *Protective Groups in Organic Synthesis, Second Edition,* Wiley, N.Y., 1991, page 360. Unexpectedly, it was discovered that this protecting group was also labile to coagulation of the polymer cement in methanol. The various N—Si protecting groups can be removed as detailed in T. W. Greene and P. G. M. Wuts, *Protective Groups in Organic Synthesis, Second Edition,* Wiley, N.Y., 1991, page 377. After deprotection, the degree of functionality of the amino polymer was determined by the method of J. S. Fritz and G. H. Schenk, *Quantitative Analytical Chemistry,* 3rd edition; Allyn and Bacon, Inc.: Boston, 1974, p. 1974. The polymer was dissolved in a 1/1 mixture of chloroform and glacial acetic acid, and titrated with perchloric acid, and with methyl violet as the indicator.

The resultant polymer can be a linear monofunctional polymer (resulting from quench of the living polymer with a protonating agent). The polymer can also be a linear telechelic polymer having two protected functional groups, in which the protecting group(s) and/or protected functionalities can be the same or different. Polymers possessing similarly protected functional groups can be deprotected by selecting a reagent specifically suited to remove the similar protecting groups. Alternatively, the invention also provides a process for the preparation of a linear polymer possessing one free telechelically functional group and one protected telechelically functional group. In this aspect of the invention, one type of protecting group is selectively deprotected from a dissimilarly protected functionality on the end(s) of the arms of the linear polymer chains, produced as described above, using selective reagents specifically suited to remove the targeted protective group and liberate the desired functionality, on the end of the polymer chain.

In yet another aspect of the invention, star or multi-branched polymers are produced by linking the living polymer anions using a coupling or linking agent as known in the art (for example the multifunctional linking agents as described above). The star polymers can be prepared using the protected amine initiators of the present invention and mixtures of these initiators. In addition, other types of protected functionalized initiators and/or non-functional initiators as known in the art can also be used in combination with the initiators of the present invention. The resultant polymers can have 3 to 30 arms. The protecting groups of the arms of the resultant star polymers can be removed, as discussed above, including the selective deprotection of dissimilar protecting groups.

The following table details experimental conditions that will selectively remove one of the protecting groups (more labile) from the polymer, while retaining the other protecting group (more stable).

| LABILE | STABLE | CONDITIONS |
| --- | --- | --- |
| t-Butyldimethylsilyl | T-Butyl | Tetrabutylammonium fluoride |
| t-Butyldimethylsilyl | T-Butyl | 1 N HCl |
| t-Butyldimethylsilyl | Dialkylamino | Tetrabutylammonium fluoride |
| t-Butyldimethylsilyl | Dialkylamino | 1 N HCl |
| t-Butyl | Dialkylamino | Amberlyst ® resin |
| t-Amyl | | |
| Trimethylsilyl | T-Butyl | Tetrabutylammonium fluoride |
| Trimethylsilyl | t-Butyl | 1 N HCl |
| Trimethylsilyl | Dialkylamino | Tetrabutylammonium fluoride |
| Trimethylsilyl | Dialkylamino | 1 N HCl |
| 2,2,5,5-Tetramethyl-2,5-disila-1-azacyclopentane | T-Butyl | Tetrabutylammonium Fluoride |
| 2,2,5,5-Tetramethyl-2,5-disila-1-azacyclopentane | T-Butyl | 1 N HCl |
| 2,2,5,5-Tetramethyl-2,5-disila-1-azacyclopentane | Dialkylamino | Tetrabutylammonium Fluoride |
| 2,2,5,5-Tetramethyl-2,5-disila-1-azacyclopentane | Dialkylamino | 1 N HCl |

In another aspect of this invention, unique polymers produced by the process described above are provided. The polymers produced by this process may have linear, branched or radial architecture. Further, the polymers may be monofunctional (produced by quench of the living anion), homotelechelic (produced by coupling of the living anion with a coupling agent with two active sites, such as dichlorodimethylsilane, or trapping of the living polymer anion with a protected, functionalized electrophile, such as 2,2,5,5-tetramethyl-1 -(3-chloropropyl)-1-aza-2,5-disila-cyclopentane), heterotelechelic (produced by quench of the living polymer anion with an electrophile), or polyfunctional (produced by coupling of the living anion with a coupling agent with more than two active sites, such as tin tetrachloride or diisopropenylbenzene).

For example, exemplary monofunctional and telechelic polymers of the invention are represented by the formulas below:

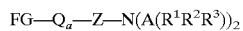

and

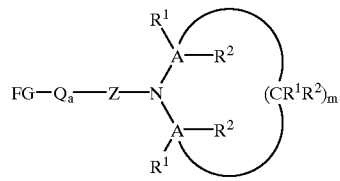

wherein:

Z is a branched or straight chain hydrocarbon connecting group which contains 3–25 carbon atoms, optionally substituted with aryl or substituted aryl;

A is an element selected from Group IVa of the Periodic Table of the Elements with the proviso that at least one A is silicon;

$R^1$, $R^2$, and $R^3$ are each independently selected from the group consisting of hydrogen, alkyl, substituted alkyl, aryl, substituted aryl, cycloalkyl, and substituted cycloalkyl;

m is an integer from 1 to 7;

Q is a saturated or unsaturated hydrocarbyl group derived by incorporation of one or more compounds selected from the group consisting of conjugated dienes, alkenylsubstituted aromatic hydrocarbons and mixtures thereof;

a is an integer from 2 to 10,000; and

FG is hydrogen or a protected or unprotected functional group.

The skilled artisan will appreciate that monofunctional polymers result when FG is hydrogen, produced by quench of the living anion. Telechelic polymers (both homotelechelic and heterotelechelic) can be prepared by reaction of the living polymer with any of the types of functionalizing agents or electrophiles as known in the art described in more detail above. For example, homotelechelic polymers can be produced by trapping of the living polymer anion with a protected, functionalized electrophile, such as 2,2,5,5-tetramethyl-1-(3-chloropropyl)-1-aza-2,5-disila-cyclopentane. Heterotelechelic polymers include those polymers in which FG and the omega protected amine functionality are different. In one aspect of the invention, heterotelechelic polymers include polymers which have been terminated using a functionalizing agent (or electrophile) of the formula X—Y—T—(A'—$R^4R^5R^6$)n (IX) wherein X, Y, T, A', $R^4$, $R^5$, $R^6$ and n are the same as defined above. Exemplary polymers functionalized with such an electrophile can have the structure below:

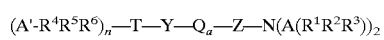

and

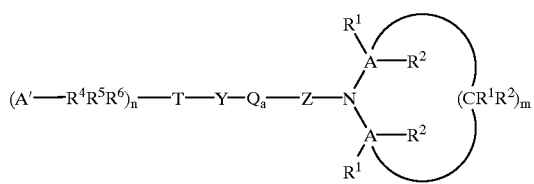

wherein:
Y, Z, T, A, A', Q, a, m, n, $R^1$, $R^2$, $R^3$, $R^4$, $R^5$, and $R^6$ are the same ascribed above (i.e., FG is —Y—T—(A'($R^4R^5R^6$)n).

The protected linear functionalized polymers can be treated to remove one or two protecting groups as described above. The resultant deprotected functionalized polymers can have the following structures:

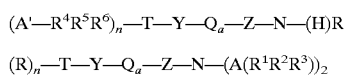

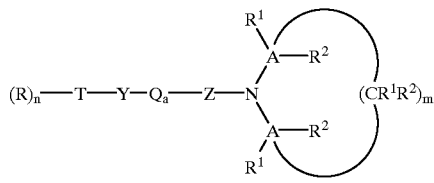

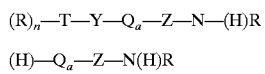

(H)—$Q_a$—Z—N(H)R wherein R is hydrogen, alkyl, substituted alkyl, phenyl or substituted phenyl. Particularly preferred polymers include polymers having telechelic primary and/or secondary amine groups, as well as their hydrogenated analogs. A primary amine results when protecting groups in which both As are silicon are removed from a protected amine functionality. A secondary amine results when protecting groups in which one A is silicon and the other A is carbon are removed from a protected amine functionality. The primary and secondary amine groups are represented generally by the formula —N(H)R, in which R is hydrogen (primary amine) or alkyl, substituted alkyl, phenyl or substituted phenyl (secondary amine).

As discussed above, the newly liberated primary or secondary amino groups can then participate in subsequent polymerization chemistry. For example, a telechelic primary diamine can react with a diisocyanate to afford a polyurethane or with an unreacted epoxy group (oxirane) groups to form partially or fully crosslinked epoxy resins. Condensation polymers can also be prepared. For example, a polyamide condensation polymer can be synthesized from the telechelic diamine and a dicarboxylic acid. In addition, when the living chain end is reacted with a protected functionalized electrophile, the resultant protected functionality can also be deprotected, and the liberated functionality can optionally be reacted with one or more comonomers to polymerize a functional end thereof. Exemplary comonomers include without limitation cyclic ethers, diamines, diisocyanates, polyisocyanates, di-, poly- and cyclic amides, di- and polycarboxylic acids, diols, polyols, anhydrides, and the like and mixtures thereof. For example, functionalized polymers can be further reacted with monofunctional monomers, such as caprolactam, or other lactams, to form a polyamide block polymer segment, or cyclic ethers such ethylene oxide to form polyether blocks; or with difunctional monomers, such as diacids or anhydrides and diamines to form polyamide blocks, or diacids or anhydrides or lactones and diols to form polyester blocks, or diols and polyols with diisocyanates or polyisocyanates to form polyurethane blocks. Polyisocyanates or polyfunctional polyols are examples of polyfunctional monomers. The functional group may also be reacted with a suitable agent containing a reactive olefinic bond, such as a styrenic or acrylic functionality, such as methacroyl chloride, which will act to change the nature of the functionality and provide a "macromonomer" capable of polymerizing with other free radically polymerizable monomers.

In yet another aspect of the invention, two or more living polymers can be linked using a coupling or linking agent as known in the art. In one embodiment of this aspect of the invention, the linking agent is a difunctional linking agent. The resultant homotelechelic polymer is represented by the below formulas:

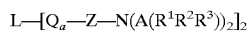

and

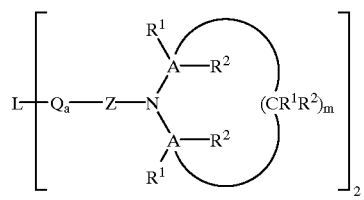

wherein:
$R^1$, $R^2$, $R^3$, Q, Z, A, a and m have the meanings ascribed above; and
L is a residue of a difunctional linking agent, such as $SiMe_2$ residue derived form the difunctional linking agent $SiMe_2Cl_2$.

In another embodiment of this aspect of the invention, the linking agent is a multifunctional linking agent. The resultant star or multi-branched polymer is represented by the below formulas:

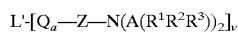

or

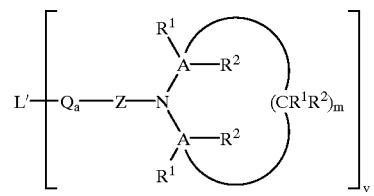

wherein:
$R^1$, $R^2$, $R^3$, Q, Z, A, a, and m have the meanings ascribed above;
L' is a residue of a multifunctional linking agent, such as divinylbenzene; and
v is from 3 to 30. As the skilled artisan will appreciate, each $R^1$, $R^2$, $R^3$, Q, Z, A, a, and m can differ if the coupled living polymers are prepared using different protected functionalized and/or non-functional initiators.

As discussed above, these homotelechelic and star or multi-branched polymers can be hydrogenated, deprotected and/or further reacted with one or more comonomers to form polymer segments. Particularly preferred polymers include homotelechelic and star or multibranched polymers having primary and/or secondary amine groups, as well as their hydrogenated analogs. As noted above, pimary amines result from the removal of protecting groups in which both As are silicon; secondary amines result from the removal of protecting groups in which one A is silicon and one A is carbon. The primary and secondary amine groups are represented generally by the formula —N(H)R, in which R is hydrogen (primary amine) or alkyl, substituted alkyl, phenyl or substituted phenyl (secondary amine).

The molecular architecture of compounds of the present invention can be precisely controlled. The degree of functionality can be adjusted by simply varying the ratio of tertiary amino functional initiator to coupling agent. Further, the monomer identity, the monomer composition and molecular weight can be independently manipulated by varying the monomer charged. Finally, the number of polymer arms can be adjusted by varying the nature of the coupling agent, and the ratio of living polymer to the coupling agent.

The present invention will be further illustrated by the following non-limiting examples.

PRECURSOR PREPARATION 1. 2,2,5,5-Tetramethyl-1-(3-chloropropyl)-1-aza-2,5-disila-cyclopentane (3-Chloropropyl STABASE) #9476

A 500 ml., 3-neck round bottom flask was equipped with a mechanical stirrer, a 250 ml. pressure equalizing addition funnel, a Claisen adapter with a Teflon® clad thermocouple, a reflux condenser, and an argon inlet. This apparatus was dried in an oven overnight at 125° C., assembled hot, and cooled to room temperature under argon. The reaction flask was charged with 3-chloropropylamine hydrochloride (32.51 grams, 0.25 mole) and methylene chloride (75 ml.). This heavy slurry was stirred at 350 rpms. Triethylamine (75.89 grams, 0.750 mole) was then added rapidly to the flask. A slight exotherm (1° C.) was noted. The reaction slurry was stirred at room temperature (20–25° C.) for one hour. The dichlorodisilane, 1,1,4,4-tetramethyl-1,4-dichlorodisilylethylene (53.82 grams, 0.250 mole) was dissolved in methylene chloride (150 ml.). This solution was then added dropwise to the reaction mixture over three hours. This addition was mildly exothermic. The reaction mixture was allowed to stir at room temperature overnight, under a blanket of argon. In the morning, an aliquot was removed from the reaction mixture, filtered through a 0.45 micron syringe filter, and analyzed by gas chromatography (GC). Both of the starting materials were present, in addition to a higher boiling product. The reaction mixture was heated to reflux for 3.5 hours. The reaction was then allowed to cool to room temperature, with stirring. The reaction mixture was transferred to a sintered glass pressure filter, and filtered with positive argon pressure (2–3 psi). The solids (triethylamine hydrochloride) were washed with additional methylene chloride (2×100 ml.). The pale orange filtrate was concentrated on a rotary evaporator, to afford 72.61 grams (123.2%) of concentrate, which contained some suspended solids. The concentrate was diluted with pentane (2×100 ml.) and additional solids precipitated. The sample was again filtered through a sintered glass filter and the filtrate was again concentrated on the rotary evaporator to afford a pale yellow liquid, 56.71 grams, yield=96.2%.

GC (area percent) analysis indicated an assay of 98.8% product.

NMR: (CDCl$_3$) 3.54 (t, J=6 Hz, 2 H), 2.93 (t, J=6 Hz, 2 H), 1.87 (p, J=6 Hz, 2 H), 0.69 (s, 4 H), and 0.04 (s, 12 H).

2. 2,2,5,5-Tetramethyl-1-(3-chloropropyl)-1-aza-2,5-disila-cyclopentane (3-Chloropropyl STABASE) #10052-508-04

A 500 ml., 3-neck round bottom flask was equipped with a mechanical stirrer, a 125 ml. pressure equalizing addition funnel, a Claisen adapter with a Teflon® clad thermocouple, a dry ice condenser, and an argon inlet. This apparatus was dried in an oven overnight at 125° C., assembled hot, and cooled to room temperature under argon. The reaction flask was charged with 3-chloropropylamine hydrochloride (32.51 grams, 0.25 mole) and tetrahydrofuran (150 ml.). This afforded a slurry of the amine hydrochloride. Triethylamine (75.51 grams, 0.746 mole) was then added to the flask. The reaction slurry was stirred at room temperature (20–25° C.) for 45 minutes at 450 rpms. The dichlorodisilane, 1,1,4,4-tetramethyl-1,4-dichlorodisilylethylene (56.14 grams, 0.26 mole) was dissolved in tetrahydrofuran (150 ml.). This feed solution was then added dropwise to the reaction mixture over 60 minutes. The addition was mildly exothermic, initially, but the reaction temperature was 25–30° C. throughout the feed with a hexane cooling bath. Periodically, an aliquot was removed from the reaction mixture, and analyzed by gas chromatography (GC). At the end of the feed, about 4–5% (area percent) of the desired product was present. The reaction mixture was heated to reflux (65–70 ° C.) for 30 minutes. Voluminous solids were present, which caused the reaction mixture to bump. Therefore, the heat source was removed. GC analysis of the reaction mixture indicated 88% product at one hour post-feed. The reaction was cooled with stirring to room temperature over an additional hour. GC analysis of reaction mixture indicated 90% product at 2.25 hours post-feed. The reaction mixture was diluted with pentane (100 ml.), transferred to a sintered glass pressure filter with pentane (100 ml.), and filtered with positive argon pressure (2–3 psi). The solids (triethylamine hydrochloride) were washed with pentane (100 ml.). The pale yellow color filtrate, 407.08 grams, was concentrated on a rotary evaporator, to afford 61.15 grams (103.7%) of concentrate. The concentrate was diluted with pentane (2×100 ml.) and additional solids precipitated. The sample was again filtered through a sintered glass filter and the filtrate was again concentrated on the rotary evaporator to afford a yellow liquid, 55.23 grams, yield=87.9%.

GC (area percent) analysis indicated an assay of 93.88% product.

3. 2,2,5,5-Tetramethyl-1-(3-chloropropyl)-1-aza-2,5-disila-cyclopentane (3-Chloropropyl STABASE) #10457-552-07

A 500 ml., 3-neck round bottom flask was equipped with a mechanical stirrer, a 125 ml. pressure equalizing addition funnel, a Claisen adapter with a Teflon® clad thermocouple, a dry ice condenser, and an argon inlet. This apparatus was dried in an oven overnight at 125° C., assembled hot, and cooled to room temperature under argon. The reaction flask was charged with 3-chloropropylamine hydrochloride (29.19 grams, 0.224 mole) and tetrahydrofuran (100 ml.). This afforded a slurry of the amine hydrochloride. Triethylamine (66.94 grams, 0.661 mole) was then added to the flask. The reaction slurry was stirred at room temperature (20–25° C.) for thirty minutes at 450 rpms. The dichlorodisilane, 1,1,4,4-tetramethyl-1,4-dichlorodisilylethylene (47.44 grams, 0.220 mole) was dissolved in tetrahydrofuran (150 ml). This feed solution was then added dropwise to the reaction mixture over 60 minutes. The addition was mildly exothermic, initially, but the reaction temperature was 25–30° C. throughout the feed with a hexane cooling bath. The reaction mixture was heated to 50° C. with a heating mantle controlled by a temperature controller. Periodically, an aliquot was removed from the reaction mixture, and analyzed by gas chromatography (GC). At the end of the feed, about 26% (area percent) of the desired product was present. GC analysis of the reaction mixture indicated 39% product at one hour post-feed. After 2.5 hours, the GC analysis indicated the reactions mixture was 46% product. Therefore, the temperature was increased to 60° C. After four hours, the reaction mixture was 92.6% product by GC analysis. The reaction was cooled with stirring to room temperature over an additional hour. The reaction mixture was diluted with pentane (100 ml.), transferred to a sintered glass pressure filter with pentane (2×100 ml.), and filtered with positive argon pressure (2–3 psi). The solids (triethylamine hydrochloride) were washed with pentane (100 ml). The pale yellow color filtrate, 339.39 grams, was concentrated on a rotary evaporator, to afford 45.77 grams (88.0%) of concentrate. Some solids were observed in the concentrate. The concentrate was therefore diluted with pentane (100 ml.) and filtered through a sintered glass filter. The filtrate was again concentrated on the rotary evaporator to afford a yellow liquid, 43.40 grams, yield=83.5%. The hazy concentrate was refiltered neat through a fine frit sintered filter. This afforded a yellow liquid, 39.20 grams, yield=75.4%.

GC (area percent) analysis indicated the product contained: 3-chloropropylamine 0.15%, 1,1,4,4-tetramethyl-1,4-dichlorodisilylethylene 0.27%, 3-chloropropyl STABASE 98.89%, and unknowns 0.69%.

MS data: 237 (M+2), 235 (M+), 192, 172 (base peak), 145, 73, and 59.

4. 2,2,5,5-Tetramethyl-1-(2-chloroethyl)-1-aza-2,5-disila-cyclopentane (2-Chloroethyl STABASE)#10077-508-22

A 500 ml., 3-neck round bottom flask was equipped with a mechanical stirrer, a 125 ml. pressure equalizing addition funnel, a Claisen adapter with a Teflon® clad thermocouple, a dry ice condenser, and an argon inlet. This apparatus was dried in an oven overnight at 125° C., assembled hot, and cooled to room temperature under argon. The reaction flask was charged with 2-chloroethylamine hydrochloride (29.0 grams, 0.25 mole) and tetrahydrofuran (100 ml.). This afforded a slurry of the amine hydrochloride. Triethylamine (75.90 grams, 0.75 mole) was then added to the flask. The reaction slurry was stirred at room temperature (20–25° C.) for sixty minutes at 450 rpms. The dichlorodisilane, 1,1,4,4-tetramethyl-1,4-dichlorodisilylethylene (52.76 grams, 0.245 mole) was dissolved in tetrahydrofuran (150 ml.). This feed solution was then added dropwise to the reaction mixture over 73 minutes. The addition was mildly exothermic; the maximum temperature was 31° C. Periodically, an aliquot was removed from the reaction mixture, and analyzed by gas chromatography (GC). At the end of the feed, about 4–5% (area percent) of the desired product was present. The reaction mixture was heated to reflux (65–70° C.) GC analysis of the reaction mixture indicated 88% product at one hour post-feed. The reaction was cooled with stirring to room temperature over an additional hour. GC analysis of reaction mixture indicated 90% product at 4.5 hours post-feed. Therefore, the reaction mixture was allowed to cool to room temperature, diluted with pentane (100 ml.), transferred to a sintered glass pressure filter with pentane (100 ml.), and filtered with positive argon pressure (2–3 psi). The solids (triethylamine hydrochloride) were washed with pentane (100 ml.). The pale yellow color filtrate was concentrated on a rotary evaporator, to afford 47.61 grams (93.5%) of concentrate, which contained some solids. The concentrate was diluted with pentane (2×100 ml.) and additional solids precipitated. The sample was again filtered through a sintered glass filter and the filtrate was again concentrated on the rotary evaporator to afford a clear, yellow liquid, 45.17 grams, yield=88.7%.

GC (area percent) analysis indicated an assay of 88.28% product.

5. 3-(N-Trimethylsilylamino)-1-chloropropane

A one liter, 3-neck round bottom flask is equipped with a mechanical stirrer, a 250 ml. pressure equalizing addition funnel, a Claisen adapter with a Teflon® clad thermocouple, a reflux condenser, and an argon inlet. This apparatus is dried in an oven overnight at 125° C., assembled hot, and cooled to room temperature under argon. The reaction flask is charged with 3-chloropropylamine hydrochloride, 65.01 grams, (0.50 mole) and diethyl ether (500 ml.). This slurry is stirred at 350 rpms. Triethylamine, 53.13 grams, (0.750 mole) is then added rapidly to the flask via the addition funnel. A slight exotherm (1° C.) is noted. The reaction slurry is stirred at room temperature (20–25° C.) for one hour. The reaction mixture is then transferred to sintered glass filter, to remove the precipitated triethylamine hydrochloride. The filtrate is collected in a dry, one liter flask. The filter cake is reslurried with additional diethyl ether (2×100 ml.). The filtrate is concentrated under reduced pressure on a rotary evaporator. A large magentic stir bar is added to the flask. The residue is treated with hexamethyldisilazane, 41.96 grams (0.26 mole, 0.52 equivalents). The catalyst, chlorotrimethylsilane, 0.54 grams (0.005 mole, 0.01 equivalent) is then added with a syringe. The flask is fitted with a Claisen adapter equipped with a thermocouple, a condenser, and a gas outlet. This solution is then heated to 150° C. with a heating mantle, controlled by a temperature controller. After four hours stirring at this temperature, an aliquot is removed from the reaction mixture, filtered through a 0.45 micron syringe filter, and analyzed by gas chromatography (GC). All of the starting material is consumed. The reaction is then allowed to cool to room temperature, with stirring. The reaction mixture is transferred to a sintered glass pressure filter, and filtered with positive argon pressure. This affords a pale yellow liquid, 80.40 grams, yield=97.1%.

GC (area percent) analysis indicates an assay of 98.8% product.

NMR: (CDCl$_3$) 3.54 (t, J=6 Hz, 2 H), 2.93 (t, J=6 Hz, 2 H), 1.87 (quin., J=6 Hz, 2 H), and 0.04 (s, 9 H).

6. 3-[N,N-Bis-(Trimethylsilyl)amino]-1-chloropropane

A one liter, 3-neck round bottom flask is equipped with a mechanical stirrer, a 125 ml. pressure equalizing addition funnel, a Claisen adapter with a Teflon® clad thermocouple, a reflux condenser, and an argon inlet. This apparatus is dried in an oven overnight at 125° C., assembled hot, and cooled to room temperature under argon. The reaction flask is charged with ethylmagnesium bromide, 1.0 Molar in THF (500 ml.). This solution is stirred at 350 rpms. 3-(N-Trimethylsilylamino)-1-chloropropane, 41.40 grams, (0.250 mole) is then added dropwise to the flask via the addition funnel. The reaction mixture is stirred at 40° C. for twelve hours. Chlorotrimethylsilane, 76.05 grams (0.70 mole) is then added via the addition funnel. The reaction mixture is then stirred at 40° C. for six hours, then allowed to cool to room temperature, with stirring. The reaction mixture is transferred to a sintered glass pressure filter, and filtered with positive argon pressure. The desired product is isolated by distillation through a 10 plate Oldershaw column. This affords a colorless liquid, 55.15 grams, yield=92.8%.

GC (area percent) analysis indicates an assay of 97.8% product.

NMR: ($CDCl_3$) 3.54 (t, J=6 Hz, 2 H), 2.93 (t, J=6 Hz, 2 H), 1.87 (quin., J=6 Hz, 2 H), and 0.04 (s, 18 H).

Initiator Preparation 7. 3-(2,2,5,5-Tetramethyl-2,5-disila-1-azacyclopentane)-1-propyllithium in Cyclohexane at 55° C. #10128-508-93

A 500 ml., 3-neck Morton flask was equipped with a mechanical stirrer, 125 ml pressure equalizing addition funnel, a Claisen adapter fitted with a thermocouple a dry ice condenser and an argon inlet. This apparatus was dried in an oven overnight at 125° C., assembled hot, and cooled to room temperature under argon. Lithium metal dispersion (0.88% sodium) was washed free of oil with hexane (3×100 ml.) and pentane (2×100 ml.), dried under argon, weighed (5.01 grams, 0.722 mole), and transferred to the reaction flask with cyclohexane (300 ml.). The reaction was stirred at 400–450 rpms and heated to 50–55° C. The heat source was removed. The precursor, 3-chloropropyl STABASE (53.73 grams, 0.224 mole, #9476, 98.5% assay by GC) was added dropwise. An exotherm was observed at approximately 15.5% of the addition. A dry ice/hexane cooling bath was applied to maintain the reaction temperature at 53–58° C. The total feed time was 37 minutes (38 ml.). The exotherm was present throughout the halide addition. The reaction was stirred with gradual cooling to room temperature for three hours post-feed. The reaction was transferred to a sintered glass pressure filter and filtered with positive argon pressure (2–3 psi). The muds were washed with cyclohexane (80 ml.). This afforded 312.71 grams of a clear yellow color product solution (400 ml.).

Analysis: total base=13.80%; active C—Li=12.51%; density=0.7924; chloride=42 ppm. Yield (based on active C—Li analysis)=84.08%.

An aliquot was withdrawn, carefully quenched with water, and examined by GC. There was 8% unreacted halide in the product solution.

8. 3-(2,2,5,5-Tetramethyl-2,5-disila-1-azacyclopentane)-1-propyllithium in Cyclohexane at Reflux, #10126-508-73

A 500 ml., 3-neck Morton flask was equipped with a mechanical stirrer, 125 ml pressure equalizing addition funnel, a Claisen adapter fitted with a thermocouple a dry ice condenser and an argon inlet. This apparatus was dried in an oven overnight at 125° C., assembled hot, and cooled to room temperature under argon. Lithium metal dispersion (0.85% sodium) was washed free of oil with hexane (3×100 ml.) and pentane (2×100 ml.), dried under argon, weighed (3.73 grams, 0.537 mole), and transferred to the reaction flask with cyclohexane (200 ml.). The reaction was stirred at 400–450 rpms and heated to 82–83° C. (mild reflux). The heat was turned off and the reaction temperature subsided a few degrees over a few minutes. The precursor, 3-chloropropyl STABASE (33.43 grams, 0.142 mole, #10109, 97.4% assay by GC) was added dropwise. Brief cooling of the reaction temperature was observed, followed by an exotherm back to reflux temperature at approximately 16% of the addition. The feed rate was adjusted to maintain reflux temperature throughout the reaction. The total feed time was 32 minutes (38 ml.). The reaction was stirred with gradual cooling to room temperature for four hours post-feed. The progress of the reaction was monitored by GC analysis. Periodically, an aliquot was withdrawn, quenched with water, and analyzed for disappearance of the starting STABASE halide. The conversion was 82.6% at the end of the feed; and 99.4% conversion at three hours post-feed. The reaction was transferred to a sintered glass pressure filter and filtered with positive argon pressure (2–3 psi). The muds were washed with cyclohexane (30 ml.). This afforded 181.78 grams of a clear yellow color product solution (225 ml.).

Analysis: total base=16.67%; active C—Li=13.73%; density=0.7924; chloride=227 ppm. Yield (based on active C—Li analysis) 87.2%.

9. 3-(2,2,5,5-Tetramethyl-2,5-disila-1-azacyclopentane)-1-propyllithium in Hexane at Reflux, #10124-508-68

A 500 ml., 3-neck Morton flask was equipped with a mechanical stirrer, 125 ml pressure equalizing addition funnel, a Claisen adapter fitted with a thermocouple a dry ice condenser and an argon inlet. This apparatus was dried in an oven overnight at 125° C., assembled hot, and cooled to room temperature under argon. Lithium metal dispersion (0.85% sodium) was washed free of oil with hexane (3×100 ml.) and pentane (2×100 ml.), dried under argon, weighed (3.34 grams, 0.481 mole), and transferred to the reaction flask with cyclohexane (300 ml.). The reaction was stirred at 400–450 rpms and heated to 69–70° C. (mild reflux). The heat was turned off and the reaction temperature subsided a few degrees over a few minutes. The precursor, 3-chloropropyl STABASE (41.64 grams, 0.172 mole) was added dropwise. Brief cooling of the reaction temperature was observed, followed by an exotherm back to reflux temperature at approximately 17% of the addition. The feed rate was adjusted to maintain reflux temperature throughout the reaction. The total feed time was 33 minutes. The reaction was stirred with gradual cooling to room temperature for three hours post-feed. The progress of the reaction was monitored by GC analysis. Periodically, an aliquot was withdrawn, quenched with water, and analyzed for disappearance of the starting STABASE halide. The conversion was 83.2% at the end of the feed; and 98.4% conversion at 1.5 hours post-feed. The reaction was transferred to a sintered glass pressure filter and filtered with positive argon pressure (2–3 psi). The muds were washed with hexane (40 ml.). This afforded 238.27 grams of a clear yellow color product solution (340 ml.).

Analysis: total base=16.61%; active C—Li=13.43%; density=0.699; chloride=92 ppm. Yield (based on active C—Li analysis)=89.7%.

10. 3-[N,N-Bis-(Trimethylsilyl)amino]-1-propyllithium in Cyclohexane at Reflux

A 500 ml., 3-neck Morton flask is equipped with a mechanical stirrer, 125 ml pressure equalizing addition funnel, a Claisen adapter fitted with a thermocouple a dry ice condenser and an argon inlet. This apparatus is dried in an oven overnight at 125° C., assembled hot, and cooled to room temperature under argon. Lithium metal dispersion (0.85% sodium) is washed free of oil with hexane (3×100 ml.) and pentane (2×100 ml.), dried under argon, weighed (5.61 grams, 0.808 mole), and transferred to the reaction flask with cyclohexane (300 ml.). The reaction is stirred at 400–450 rpms and heated to mild reflux. The heat is turned off and the reaction temperature subsided a few degrees over a few minutes. The precursor, 3-[N,N-Bis-(trimethylsilylamino)]-1-chloropropane (80.01 grams, 0.337 mole) was added dropwise. Brief cooling of the reaction temperature is observed, followed by an exotherm back to reflux temperature at approximately 14% of the addition. The feed rate is adjusted to maintain reflux temperature throughout the reaction. The total feed time is forty five minutes. The reaction is stirred with gradual cooling to room temperature for three hours post-feed. The progress of the reaction is monitored by GC analysis. Periodically, an aliquot is withdrawn, quenched with water, and analyzed for disappearance of the precursor halide. The conversion was 83.2% at the end of the feed; and 99% conversion at 2.5 hours post-feed. The reaction is transferred to a sintered glass pressure filter and filtered with positive argon pressure (2–3 psi). The muds are washed with cyclohexane (2×30 ml.). This affords 348.10 grams of a clear yellow color product solution.

Analysis: total base=19.13%; active C—Li=18.02%. Yield (based on active C—Li analysis)=89.2%.

Polymerization

11. Preparation of Protected-Alpha-Amino-Polyisoprene

A 500 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with 3-(2,2,5,5-tetramethyl-2,5-disila-1-azacyclopentane)-1-propyllithium, 1.46 mmoles (0.303 grams active of 14.0 wt % in cyclohexane), and purified cyclohexane (250 ml.). The reactor was then flame sealed off. Triethylamine, 0.148 grams (1.46 mmole) was added from a break-seal ampoule. Purified isoprene monomer (10.20 grams, 150 mmoles) was added from a break-seal ampoule. The reaction mixture was stirred for twenty four hours at room temperature. The living, functionalized poly(isoprenyl)lithium was terminated with degassed methanol from the last ampoule. 2,6-Di-tert-butyl-4-methylphenol (BHT, 0.01%) was added to the polymer solution as an antioxidant. The resultant protected, functionalized polymer was isolated by concentration of the organic solution.

The resultant functionalized polyisoprene polymer was characterized by SEC (polyisoprene standards), and had the following properties:

$M_n$=9,200 g/mole
$M_w$=9,800 g/mole
$M_w/M_n$=1.07

Examination of the $^1$H NMR indicated the microstructure was 85% 1,4 enchainment, and the presence of the silyl protecting group.

TLC analysis (toluene eluant) showed a single component, with a large $R_f$ value.

12. Preparation of Alpha-Amino-Polyisoprene

A 500 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with 3-(2,2,5,5-tetramethyl-2,5-disila-1-azacyclopentane)-1-propyllithium, 1.46 mmoles (0.303 grams active of 14.0 wt % in cyclohexane), and purified cyclohexane (250 ml.). The reactor was then flame sealed off. Triethylamine, 1.48 grams (14.6 mmole) was added from a break-seal ampoule. Purified isoprene monomer (10.20 grams, 150 mmoles) was added from a break-seal ampoule. The reaction mixture was stirred for twenty four hours at room temperature. The living, functionalized poly(isoprenyl)lithium was terminated with degassed methanol from the last ampoule. 2,6-Di-tert-butyl-4-methylphenol (BHT, 0.01%) was added to the polymer solution as an antioxidant. The resultant functionalized polymer was precipitated into a large amount of methanol. The polymer was redissolved in THF, and washed five times with methanol to remove the silyl protecting group. The resultant functionalized polyisoprene polymer was characterized by SEC (polyisoprene standards), and had the following properties:

$M_n$=9,200 g/mole
$M_w$=10,200 g/mole
$M_w/M_n$=1.11

Examination of the $^1$H NMR indicated the microstructure was 67% 1,4 enchainment. TLC analysis (toluene eluant) showed a single component, with a low $R_f$ value. The end group functionality was determined by titration in a ⅓ mixture of chloroform and glacial acetic acid, with perchloric acid as the tititrant, and methyl violet as the indicator. This titration indicated the polymer possessed a functionality of 1.06.

13. Preparation of Alpha-Amino-Polyisoprene

A 500 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with 3-(2,2,5,5-tetramethyl-2,5-disila-1-azacyclopentane)-1-propyllithium, 1.46 mmoles (0.303 grams active of 14.0 wt % in cyclohexane), and purified cyclohexane (250 ml.). The reactor was then flame sealed off. Triethylamine, 0.148 grams (1.46 mmole) was added from a break-seal ampoule. Purified isoprene monomer (10.20 grams, 150 mmoles) was added from a break-seal ampoule. The reaction mixture was stirred for six hours at 60° C. The living, functionalized poly(isoprenyl)lithium was terminated with degassed methanol from the last ampoule. 2,6-Di-tert-butyl-4-methylphenol (BHT, 0.01%) was added to the polymer solution as an antioxidant. The resultant functionalized polymer was precipitated into a large amount of methanol. The polymer was redissolved in THF, and washed five times with methanol to remove the silyl protecting group.

The resultant functionalized polyisoprene polymer was characterized by SEC (polyisoprene standards), and had the following properties:

$M_n$=8,300 g/mole
$M_w$=9,000 g/mole $M_w/M_n=1.08$

Examination of the $^1$H NMR indicated the microstructure was 85% 1,4 enchainment. TLC analysis (toluene eluant) showed a single component, with a low $R_f$ value. The end group functionality was determined by titration in a ¼ mixture of chloroform and glacial acetic acid, with perchloric acid as the tititrant, and methyl violet as the indicator. This titration indicated the polymer possessed a functionality of 1.02.

14. Preparation of Alpha-Amino-Polystyrene

A 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with 3-(2,2,5,5-tetramethyl-2,5-disila-1-azacyclopentane)-1-propyllithium, 3.74 mmoles (0.776 grams active of 14.0 wt % in cyclohexane), and purified benzene (150 ml.). The reactor was then flame sealed off. N,N,N',N'-Tetramethylethylenediamine, 0.435 grams (3.74 mmole) was added from a break-seal ampoule. Purified styrene monomer (11.20 grams, 108 mmoles) was added from a break-seal ampoule. The reaction mixture was stirred for four hours at 25° C. The living, functionalized poly(styrenyl)lithium was terminated with degassed methanol from the last ampoule. The resultant functionalized polymer was precipitated into a large amount of methanol. The polymer was redissolved in THF, and washed five times with methanol to remove the silyl protecting group.

The resultant functionalized polyisoprene polymer was characterized by SEC (polystyrene standards), and had the following properties:

$M_n$=3,000 g/mole $M_w$=3,600 g/mole $M_w/M_n$=1.23

TLC analysis (toluene eluant) showed a single component, with a low $R_f$ value. The end group functionality was determined by titration in a ¼ mixture of chloroform and glacial acetic acid, with perchloric acid as the tititrant, and methyl violet as the indicator. This titration indicated the polymer possessed a functionality of 1.03.

15. Preparation of Alpha, Omega-Diamino-Polystyrene

A 250 ml. glass reactor was equipped with four break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with 3-(2,2,5,5-tetramethyl-2,5-disila-1-azacyclopentane)-1-propyllithium, 3.74 mmoles (0.776 grams active of 14.0 wt % in cyclohexane), and purified benzene (150 ml.). The reactor was then flame sealed off. N,N,N',N'-Tetramethylethylenediamine, 0.435 grams (3.74 mmole) was added from a break-seal ampoule. Purified styrene monomer (11.20 grams, 108 mmoles) was added from a break-seal ampoule. The reaction mixture was stirred for four hours at 25° C. The living, functionalized poly(styrenyl)lithium was functionalized by the addition of 1.32 grams (5.6 mmole, 1.5 equivalents) of 2,2,5,5-tetramethyl-1-(3-chloropropyl)-1-aza-2,5-disila-cyclopentane, added from a break-seal ampoule. Lithium chloride, 0.238 grams (5.6 mmole, 1.5 equivalents) was added to aid functionalization. The reaction was stirred for two hours, then terminated with degassed methanol from the last ampoule. The resultant difunctionalized polymer was precipitated into a large amount of methanol. The polymer was redissolved in THF, and washed five times with methanol to remove the two silyl protecting groups.

The resultant functionalized polyisoprene polymer was characterized by SEC (polystyrene standards), and had the following properties:

$M_n$=3,000 g/mole $M_w$=3500 g/mole $M_w/M_n$=1.23

TLC analysis (toluene eluant) showed a single component, with a low $R_f$ value. The end group functionality was determined by titration in a ¼ mixture of chloroform and glacial acetic acid, with perchloric acid as the tititrant, and methyl violet as the indicator. This titration indicated the polymer possessed a functionality of 2.01.

16. Preparation of Alpha, Omega-Diamino-Polyisoprene via Coupling

A 500 ml. glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. The reactor is charged with 3-(2,2,5,5-tetramethyl-2,5-disila-1-azacyclopentane)-1-propyllithium, 1.46 mmoles (0.303 grams active of 14.0 wt % in cyclohexane), and purified cyclohexane (250 ml.). The reactor is then flame sealed off. Triethylamine, 0.148 grams (1.46 mmole) is added from a break-seal ampoule. Purified isoprene monomer (10.20 grams, 150 mmoles) is added from a break-seal ampoule. The reaction mixture is stirred for six hours at 60° C. The living, functionalized poly(isoprenyl)lithium is coupled by the addition of 0.28 grams (2.19 mmole, 1.5 equivalents) of dichlorodimethylsilane, added from a break-seal ampoule. Lithium chloride, 0.09 grams (2.19 mmole, 1.5 equivalents) is added to aid functionalization. The reaction is stirred for two hours, then terminated with degassed methanol from the last ampoule. 2,6-Di-tert-butyl-4-methylphenol (BHT, 0.01%) is added to the polymer solution as an antioxidant. The resultant functionalized polymer is precipitated into a large amount of methanol. The polymer is redissolved in THF, and washed five times with methanol to remove the silyl protecting group.

The resultant functionalized polyisoprene polymer is characterized by SEC (polyisoprene standards), and has the following properties:

$M_n$=16,500 g/mole $M_w$=17,800 g/mole $M_w/M_n$=1.08

Examination of the $^1$H NMR indicates the microstructure is 85% 1,4 enchainment. TLC analysis (toluene eluant) shows a single component, with a low $R_f$ value. The end group functionality is determined by titration in a ¼ mixture of chloroform and glacial acetic acid, with perchloric acid as the tititrant, and methyl violet as the indicator. This titration indicats the polymer possessed a functionality of 1.99.

17. Preparation of Alpha-Amino-Omega-t-Butoxy-Polyisoprene

A 500 ml. glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. The reactor is charged with 3-(2,2,5,5-tetramethyl-2,5-disila-1-azacyclopentane)-1-propyllithium, 1.46 mmoles (0.303 grams active of 14.0 wt % in cyclohexane), and purified cyclohexane (250 ml.). The reactor is then flame sealed off. Triethylamine, 0.148 grams (1.46 mmole) is added from a break-seal ampoule. Purified isoprene monomer (10.20 grams, 150 mmoles) is added from a break-seal ampoule. The reaction mixture is stirred for six hours at 60° C. The living, functionalized poly(isoprenyl)lithium is functionalized by the addition of 0.33 grams (2.19 mmole, 1.5 equivalents) of 3-(1,1-dimethylethoxy)-1-chloropropane, added from a break-seal ampoule. Lithium chloride, 0.09 grams (2.19 mmole, 1.5 equivalents) is added to aid functionalization. The reaction is stirred for two hours, then terminated with degassed methanol from the last ampoule. 2,6-Di-tert-butyl-4-methylphenol (BHT, 0.01%) is added to the polymer solution as an antioxidant. The resultant functionalized polymer is precipitated into a large amount of methanol. The polymer is redissolved in THF, and washed five times with methanol to remove the silyl protecting group.

The resultant functionalized polyisoprene polymer is characterized by SEC (polyisoprene standards), and has the following properties:

$M_n$=8,300 g/mole $M_w$=9,000 g/mole $M_w/M_n$=1.08

Examination of the $^1$H NMR indicates the microstructure is 85% 1,4 enchainment. TLC analysis (toluene eluant) shows a single component, with a low $R_f$ value. The end group functionality is determined by titration in a 1/4 mixture of chloroform and glacial acetic acid, with perchloric acid as the tititrant, and methyl violet as the indicator. This titration indicates the polymer possessed a functionality of 0.99.

18. Synthesis of Protected Amino Functionalized Polyisoprene Star by DVB Linking of Tapered Poly(isoprene-b-stryrvl)lithium (PI-b-PSLi) Anions A 250 ml. glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-[N,N-Bis-(trimethylsilyl)-1-propyllithium 18.1 wt. % in cyclohexane, 0.142 grams (0.681 mmoles) is added to the reactor with a syringe via the inlet tube. The solvent is removed and the inlet tube is then flame sealed. Benzene, 200 ml., is then vacuum distilled directly into the reactor and is melted. The flask is then removed from the vacuum line by a flame seal. Styrene monomer, 1.02 grams (9.79 mmole) and isoprene monomer, 16.00 grams (234.8 mmole) are added from break seal ampoules ([isoprene]/[styrene]=24. After addition of the monomers, the reaction solution is frozen at −78° C., and the ampoules which previously contained the monomers are heat-sealed from the reactor in order to reduce headspace within the system. The reaction mixture is then placed in a constant temperature bath at 50° C. for eight hours to complete the polymerization. The polymerization reaction is monitored by UV/Vis spectra for disappearance of the polyisoprenyl absorbance at 292 nm. When the polymerization is complete, a 2 ml. aliquot is withdrawn through the sample port, and quenched with a minimal amount of methanol. The resultant base polymer is analyzed by SEC.

The reactor is intermittently degassed several times during five hours to remove any residual isoprene. The star polymer is then formed by the addition of 0.48 grams of 55% divinylbenzene (2.04 mmoles) ([DVB]/[PI-b-PSLi]=3.0 from a break seal ampoule. The reaction mixture is stirred at 60° C. for nine hours, then is quenched with a minimal amount of degassed methanol added from the last break seal ampoule. The resultant protected, functionalized star polymer is isolated by concentration of the organic solution. The resultant functionalized base polymer is characterized by SEC, and has the following properties:

$M_n$=2.52×10$^4$ g/mole $M_w$=2.63×10$^4$ g/mole $M_w/M_n$=1.04

The resultant functionalized star polymer is fully characterized by $^1$H NMR and SEC, and has the following properties:

$M_n$=2.02×10$^5$ g/mole.

$M_w$=2.24×10$^5$ g/mole $M_w/M_n$=1.11

Yield=94%

% Unlinked=6%

TLC analysis (toluene eluant) shows a single component, with a high $R_f$ value. The $^1$H NMR spectrum exhibits a peak at 0.04 ppm for the trimethylsilyl group.

19. Deprotection of Functionalized Polyisoprene Star

A 100 ml. flask is fitted with a magnetic stirrer, a reflux condenser, and a gas outlet. This flask is charged with a 5.0 gram sample of the protected amino functionalized star polymer prepared in Example 18, and tetrahydrofuran (25 ml.). Aqueous hydrochloric acid, 10 ml of 1 N solution is added, and this mixture is heated to reflux. The deprotection reaction is monitored by TLC (toluene eluant) for the disappearance of the starting material. The reaction mixture is then allowed to cool to room temperature. The deprotected polymer is isolated by precipitation into methanol. The amino functionalized star polymer is vacuum dried, and characterized by SEC and NMR.

The resultant functionalized star polymer is fully characterized by $^1$H NMR and SEC, and has the following properties:

$M_n$=2.02×10$^5$ g/mole.

$M_w$=2.24×10$^5$ g/mole $M_w/M_n$=1.11

Yield=94%

% Unlinked=6%

TLC analysis (toluene eluant) shows a single component, with a low $R_f$ value. The peak at 0.04 ppm for the trimethylsilyl group has completely disappeared from the $^1$H NMR spectrum.

The foregoing examples are illustrative of the present invention and are not to be construed as limiting thereof. The invention is defined by the following claims, with equivalents of the claims to be included therein.

That which is claimed is:

1. An amine anionic polymerization initiator comprising one or more compounds selected from the group consisting of

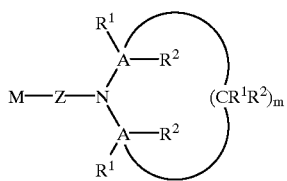

and

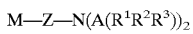

wherein:

M is an alkali metal selected from the group consisting of lithium, sodium and potassium;

Z is a branched or straight chain hydrocarbon connecting group which contains 3–25 carbon atoms, unsubstituted or substituted with aryl or substituted aryl;

A is an element selected from Group IVa of the Periodic Table of the Elements with the proviso that at least one A is silicon;

$R^1$, $R^2$, and $R^3$ are each independently selected from the group consisting of hydrogen, alkyl, substituted alkyl, aryl, substituted aryl, cycloalkyl, and substituted cycloalkyl; and m is an integer from 1 to 7.

2. The initiator of claim 1, wherein each A is silicon.

3. The initiator of claim 1, wherein one A is silicon and one A is carbon.

4. The initiator of claim 1, wherein said initiator is a compound of the formula M—Z—N(A($R^1R^2R^3$))$_2$.

5. The initiator of claim 1, wherein said initiator is a compound of the formula

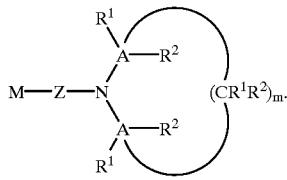

6. The initiator of claim 1, wherein said initiator is selected from the group consisting of:

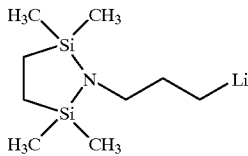

3-(2,2,5,5-tetramethyl-2,5-disila-1-azacyclopentane)-1-propyllithium

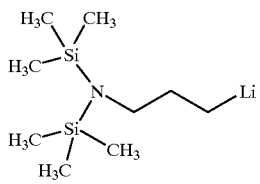

3-[N,N-bis-(trimethylsilyl)amino]-1-propyllithium

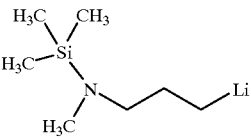

3-[N-methyl-N-(trimethylsilyl)amino]-1-propyllithium, and mixtures thereof.

7. The initiator of claim 1, wherein M is lithium.

8. A process for making amine anionic polymerization initiators, comprising reacting one or more omega-tertiary-amino-1-haloalkanes of the formula

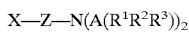

or

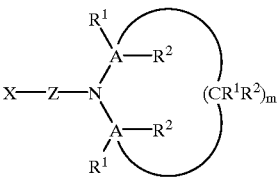

wherein:

X is halogen;

Z is a branched or straight chain hydrocarbon connecting group which contains 3–25 carbon atoms, unsubstituted or substituted with aryl or substituted aryl;

A is an element selected from Group IVa of the Periodic Table of the Elements with the proviso that at least one A is silicon;

$R^1$, $R^2$, and $R^3$ are each independently selected from the group consisting of hydrogen, alkyl, substituted alkyl, aryl, substituted aryl, cycloalkyl, and substituted cycloalkyl; and m is an integer from 1 to 7, with an alkali metal at a temperature between about 35° C. and about 130° C. in an alkane, cycloalkane, or aromatic reaction solvent or mixtures of such solvents to form one or more amine initiators of the formula

or

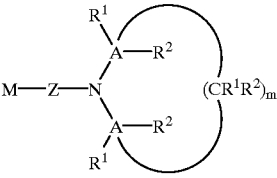

wherein M is an alkali metal and Z, A, $R^1$, $R^2$, $R^3$, and m are the same as defined above.

9. The process of claim 8, wherein each A is silicon.

10. The process of claim 8, wherein one A is silicon and one A is carbon.

11. The process of claim 8, wherein said omega-tertiary-amino-1-haloalkane is a compound of the formula X—Z—N(A($R^1R^2R^3$))$_2$.

12. The process of claim 8, wherein said omega-tertiary-amino-1-haloalkane is a compound of the formula

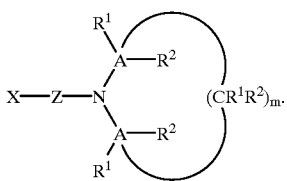

13. The process of claim 8, wherein said omega-tertiary-amino-1-haloalkane is selected from the group consisting of:

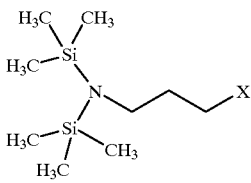

3-(2,2,5,5-tetramethyl-2,5-disila-1-azacyclopentane)-1-propyl halide

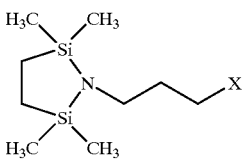

3-[N,N-bis-(trimethylsilyl)amino]-1-propyl halide

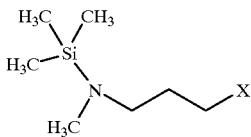

3-[N-methyl-N-(trimethylsilyl)amino]-1-propyl halide and mixtures thereof.

14. The process of claim 8, wherein M is lithium.

15. The initiator of claim 1, wherein the solubility of the initiator in a hydrocarbon solution is at least about 20 weight percent.

16. The process of claim 8, wherein said omega-tertiary-amino-1-haloalkane is selected from the group consisting of 3-(2,2,5,5-tetramethyl-2,5-disila-1-azacyclopentane)-1-propyl halide, 2-methyl-3-(2,2,5,5-tetramethyl-2,5-disila-1-azacyclopentane)-1-propyl halide, 2,2-dimethyl-3-(2,2,5,5-tetramethyl-2,5-disila-1-azacyclopentane)-1-propyl halide, 4-(2,2,5,5-tetramethyl-2,5-disila-1-azacyclopentane)-1-butyl halide, 6-(2,2,5,5-tetramethyl-2,5-disila-1-azacyclopentane)-1-hexyl halide, 3-[N,N-(bis(trimethylsilyl)]-1-propyl halide, 3-[N,N-bis(trimethylsilyl)]-2-methyl-1-propyl halide, 3-[N,N-bis(trimethylsilyl)]-2,2-dimethyl-1-propyl halide, 4-[N,N-bis(trimethylsilyl)]-1-butyl halide, 5-[N,N-bis(trimethylsilyl)]-1-pentyl halide, 8-[N,N-bis (trimethylsilyl)]-1-octyl halide, 3-[N-(1,1-dimethylethyl)-N-(trimethylsilyl)]-1-propyl halide, 3-[N-(1,1-dimethylethyl)-N-(trimethylsilyl)]-2-methyl-1-propyl halide, 3-[N-(1,1-dimethylethyl)-N-(trimethylsilyl) ]-2,2-dimethyl-1-propyl halide, 3-[N-(1,1-dimethylethyl)-N-(t-butyldimethylsilyl)]-1 -propyl halide, 3-[N-(1,1-dimethylethyl)-N-(t-butyldimethylsilyl)]-2-methyl-1-propyl halide, 8-[N-(1,1-dimethylethyl)-N-(t-butyldimethylsilyl)]-1-octyl halide, 3-[N-(methyl)-N-(t-butyldimethylsilyl) ]-1-propyl halide, 3-[N-(methyl)-N-(t-butyldimethylsilyl)]-2-methyl-1-propyl halide, 4-[N-(methyl)-N-(t-butyldimethylsilyl)]-1-butyl halide, 8-[N-(methyl)-N-(t-butyldimethylsilyl) ]-1-octyl halide, 3-[N-(methyl)-N-(t-butyldiphenylsilyl)]-1-propyl halide and mixtures thereof.

17. The process of claim 8, wherein said alkali metal comprises a dispersion of alkali metal particles.

18. The process of claim 17, wherein said alkali metal particles have a particle size between about 10 and about 300 microns.

19. The process of claim 8, wherein said alkali metal comprises lithium metal having a sodium content of about 0.2 to about 1.0 weight percent.

* * * * *